T. BRABSON.
VALVE.
APPLICATION FILED FEB. 24, 1914.
1,281,759.
Patented Oct. 15, 1918.
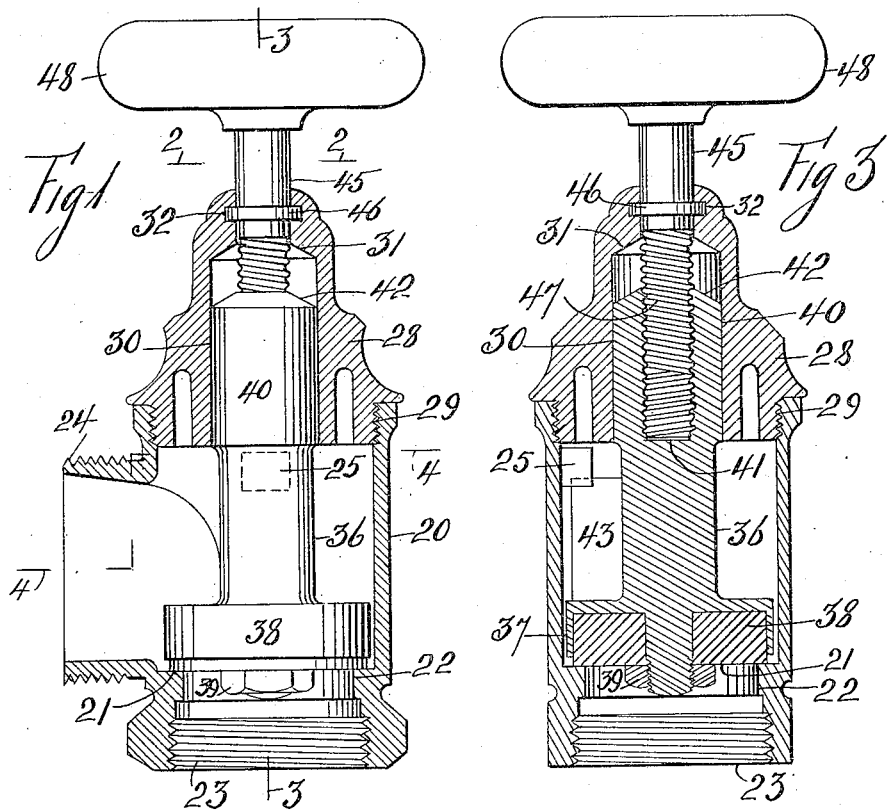
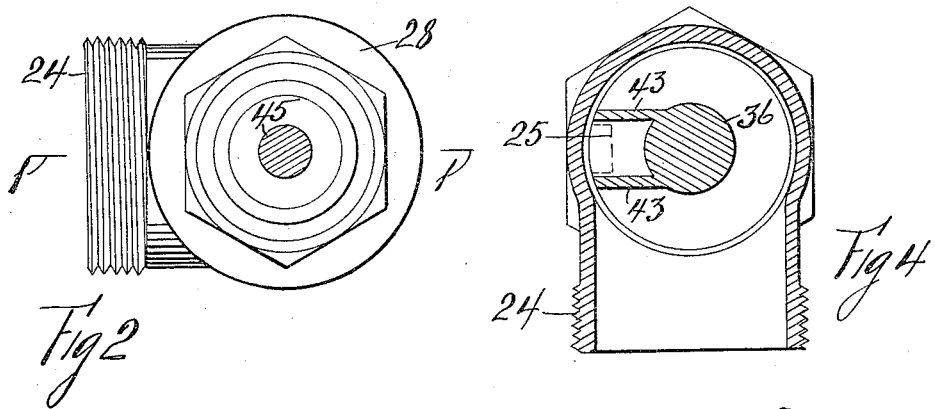
Inventor
Tom Brabson
By his Attorney

UNITED STATES PATENT OFFICE.

TOM BRABSON, OF BROOKLYN, NEW YORK.

VALVE.

1,281,759.  Specification of Letters Patent.  Patented Oct. 15, 1918.

Application filed February 24, 1914. Serial No. 820,448.

*To all whom it may concern:*

Be it known that I, TOM BRABSON, a citizen of the United States, and a resident of the borough of Brooklyn, in the county of Kings and State of New York, have invented certain new and useful Improvements in Valves, of which the following is a specification.

This invention relates to a valve and it is specifically characterized by being devoid of packing for its valve spindle. The valve spindle has connected thereto a valve for the valve seat of the inlet port and an annular shoulder formed integral therewith for coacting with a seat formed in the cap of the valve. The coaction of said annular shoulder and its valve seat prevents leakage around the valve spindle when it is at the upper end of its stroke. The cap of the valve has also formed therein an elongated guide for the valve spindle and constitutes an efficient barrier to prevent leakage between the valve spindle and cap of the barrel. Means are provided to enable the valve spindle to move vertically, and other means prevent its turning.

Figure 1 shows an elevation and vertical section of the improved valve as on a line 1, 1 of Fig. 2, Fig. 2 represents a plan view and section as on the line 2, 2 of Fig. 1, Fig. 3 shows an elevation and partial section of Fig. 1 on the line 3, 3 and Fig. 4 represents a section as on the line 4, 4 of Fig. 1.

The body or casing of the valve is indicated at 20 having the valve seat 21 for the inlet port 22. A threaded inlet 23 and the threaded outlet 24 are formed with the casing 20. A guide 25 extends from the inner wall of said casing.

A cap 28 has the right hand threaded end 29 by means of which it is detachably secured to the casing 20. An elongated cylindrical guide 30 open at one end with the seat 31 is formed in the cap 28.

An annular groove 32 is formed in the cap 28 above the seat 31, the metal at the upper end of the groove being spun to hug the valve spindle to be described after the latter is in place. A valve spindle is indicated at 36, which at its lower end has formed therewith the pocket 37 for the valve 38, the said valve being held in place by the nut 39 in the usual manner. The upper end of the said valve spindle is enlarged at 40 to form an efficient bearing with the elongated guide 30. A left hand thread 41 is formed in said valve spindle 36 and an annular shoulder 42 is formed at its upper end. A pair of guide lugs 43 extend from the spindle 36 and straddle the guide 25.

An operating valve spindle 45 has formed therewith the flange or collar 46 and the left hand threaded end 47. A disk handle 48 is connected to the spindle 45 in the usual manner. The flange or collar 46 is engaged in the annular groove 32.

The valve 38 is shown in its closed position. To open the said valve the user turns the disk handle 48 which raises the spindle 36 and the coaction of the guide 25 and the guide lugs 43 prevents the said valve 38 from turning. The disk handle 48 is turned until the shoulder 42 is seated on the seat 31 and thereby leakage is prevented through the cap 28. The coaction of the bearing surface 40 with the guide 30 forms an efficient barrier for any fluid entering the top end of the guide 30.

Having described my invention what I desire to secure by Letters Patent and claim is:

In a valve, the combination of a valve casing having an inlet opening and an outlet opening, a port with a valve seat for said inlet opening, a cap having an elongated guide and an annular groove at the upper end thereof, the said cap detachably connected to said valve casing, a seat formed at the upper end of the said guide below the groove in the cap, a valve spindle with an elongated bearing surface and an annular shoulder integral with said spindle and located at its upper end within the casing, said annular shoulder adapted to coact with the seat in the cap, the said bearing coacting with the elongated guide of said cap, a valve for said spindle adapted to coact with said valve seat, guide lugs extending from the valve spindle, a guide extending from the casing engaging with said guide lugs to prevent the said spindle turning, an operating valve spindle in threaded engagement with the first named spindle to vertically move the latter, and a collar on the operating valve spindle engaging in the annular groove in the cap to maintain the operating valve spindle in proper position.

Signed at the borough of Manhattan, in the county of New York and State of New York, this 10th day of February, A. D. 1914.

TOM BRABSON.

Witnesses:
A. A. DE BONNEVILLE,
JOHN JESSICH.

Copies of this patent may be obtained for five cents each, by addressing the "Commissioner of Patents, Washington, D. C."